United States Patent
Yuk et al.

(10) Patent No.: US 9,526,049 B2
(45) Date of Patent: Dec. 20, 2016

(54) METHOD FOR PERFORMING HANDOVER IN A C-RAN SYSTEM, AND APPARATUS THEREFOR

(71) Applicant: LG ELECTRONICS INC., Seoul (KR)

(72) Inventors: Youngsoo Yuk, Anyang-si (KR); Sunam Kim, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 14/380,395

(22) PCT Filed: Feb. 22, 2013

(86) PCT No.: PCT/KR2013/001440
§ 371 (c)(1),
(2) Date: Aug. 22, 2014

(87) PCT Pub. No.: WO2013/125900
PCT Pub. Date: Aug. 29, 2013

(65) Prior Publication Data
US 2015/0036664 A1    Feb. 5, 2015

Related U.S. Application Data

(60) Provisional application No. 61/602,088, filed on Feb. 23, 2012, provisional application No. 61/602,605, (Continued)

(51) Int. Cl.
*H04W 36/30* (2009.01)
*H04W 36/00* (2009.01)
(Continued)

(52) U.S. Cl.
CPC ......... *H04W 36/0094* (2013.01); *H04W 24/08* (2013.01); *H04W 36/0055* (2013.01); *H04W 36/30* (2013.01); *H04W 88/06* (2013.01)

(58) Field of Classification Search
CPC ............ H04W 36/30; H04W 36/0055; H04W 36/0094; H04W 24/08; H04W 88/06
See application file for complete search history.

(56) References Cited

U.S. PATENT DOCUMENTS 8,085,782 B2 * 12/2011 Fahldieck ........... H04W 88/085
370/394
8,112,087 B2 * 2/2012 Jeong ................... H04W 76/02
370/328
(Continued)

OTHER PUBLICATIONS

3rd Generation Partnership Project, Technical Specification Group Radio Access Network, Evolved Universal Terrestrial Radio Access (E-UTRA), Physical channels and modulation (Release 13), Mar. 2016, 3GPP TS 36.211 v13.1.0, pp. 1-155.*
(Continued)

*Primary Examiner* — Omar Ghowrwal
(74) *Attorney, Agent, or Firm* — Dentons US LLP

(57) ABSTRACT

The present invention relates to a method for a terminal to perform a handover in a cloud radio access network (C-RAN), including the steps of: receiving information on at least one candidate remote radio head (RRH); measuring the strength of received signals from at least one candidate RRH and a serving cell for the terminal; and, when the strength of the received signals from the candidate RRH and the serving cell of the terminal satisfy a predetermined relationship according to the measured result, transmitting feedback information, including the measured result, to the candidate RRH.

12 Claims, 13 Drawing Sheets

Related U.S. Application Data filed on Feb. 24, 2012, provisional application No. 61/623,072, filed on Apr. 12, 2012.

(51) Int. Cl.
*H04W 24/08* (2009.01)
*H04W 88/06* (2009.01)

(56) References Cited

U.S. PATENT DOCUMENTS

| | | | |
|---|---|---|---|
| 9,184,938 B2* | 11/2015 | Kutt | G06Q 20/065 |
| 9,210,729 B2* | 12/2015 | Kutt | H04L 12/14 |
| 2006/0199584 A1 | 9/2006 | Bergstrom et al. | |
| 2010/0135201 A1 | 6/2010 | Lewis et al. | |
| 2011/0207459 A1* | 8/2011 | Ramasamy | H04W 36/0061 |
| | | | 455/436 |
| 2011/0243553 A1 | 10/2011 | Russell | |
| 2012/0213162 A1* | 8/2012 | Koo | H04W 16/14 |
| | | | 370/329 |
| 2013/0064189 A1* | 3/2013 | Tokgoz | H04W 28/22 |
| | | | 370/329 |
| 2013/0336224 A1* | 12/2013 | Davydov | H04B 7/2656 |
| | | | 370/328 |
| 2014/0187243 A1* | 7/2014 | Rune | H04W 36/26 |
| | | | 455/436 |
| 2015/0256570 A1* | 9/2015 | Joon | H04M 1/2535 |
| | | | 370/261 |

OTHER PUBLICATIONS

3rd Generation Partnership Project, Technical Specification Group Radio Access Network, Evolved Universal Terrestrial Radio Access (E-UTRA), Physical layer procedures (Release 13), Mar. 2016, 3GPP TS 36.213 v13.1.1, pp. 1-361.*

3rd Generation Partnership Project, Technical Specification Group Radio Access Network, Evolved Universal Terrestrial Radio Access (E-UTRA), Protocol specification (Release 13), Mar. 2016, 3GPP TS 36.331 v13.1.0, pp. 1-551.*

3rd Generation Partnership Project, Technical Specification Group Radio Access Network, Evolved Universal Terrestrial Radio Access (E-UTRA), Multiplexing and channel coding (Release 13), Mar. 2016, 3GPP TS 36.212 v13.1.0, pp. 1-129.*

3rd Generation Partnership Project, Technical Specification Group Radio Access Network, High Speed Downlink Packet Access (HSDPA), Overall description, Stage 2, Dec. 2015, 3GPP TS 25.308 v13.1.0, pp. 1-76.*

IEEE Computer Society and the IEEE Microwave Theory and Techniques Society, IEEE Standard for WirelessMAN—Advanced Air Interface for Broadband Wireless Access Systems, Sep. 7, 2012, pp. 1-1090.*

3rd Generation Partnership Project, Technical Specification Group Services and System Aspects, Architecture enhancements for non-3GPP accessses (Release 13), Mar. 2016, 3GPP TS 23.402 v13.5.0, pp. 1-299.*

3rd Generation Partnership Project, Technical Specification Group Services and System Aspects, IP flow mobility and seamless Wireless Local Area Network (WLAN) offload, stage 2 (Release 13), Dec. 2015, 3GPP TS 23.261 v13.0.0, pp. 1-22.*

C-RAN The Road towards Green RAN, White Paper, Version 2.5, China Mobile Research Institute, Oct. 30, 2011.

* cited by examiner

RSRP_cell – RSRP_RRH

Comparing with a case of a legacy macro

METHOD FOR PERFORMING HANDOVER IN A C-RAN SYSTEM, AND APPARATUS THEREFOR This application is a 34 USC §371 National Stage entry of International Application No. PCT/KR2013/001440 file on Feb. 22, 2013, and claims priority to U.S. Provisional Application Nos. 61/602,088 filed on Feb. 23, 2012, 61/623,072 on Apr. 12, 2012 and 61/602,605 filed on Feb. 24, 2012, which are hereby incorporated by the reference in their entireties as if fully set forth herein.

TECHNICAL FIELD

The present invention relates to a wireless communication, and more particularly, to a method of performing a handover in a C-RAN system and an apparatus therefor.

BACKGROUND ART

Starting from AMPS, which is a first generation analog mobile communication system, a 30-year history of mobile communication commercialization has become a vital part of our everyday lives while going with many changes in society. In particular, for several years, a mobile communication network has rapidly developed while making various changes to society at large.

In case of a third generation communication system, popularization of the third generation communication system considerably fell into arrears due to unbalanced development between a mobile communication and a mobile computing. Unlike the third generation communication system, a fourth generation communication has rapidly developed based on computing environment, which has changed from such a personal computer as a desktop, a notebook and the like to such a personal information device as a smartphone, a tablet and the like. In particular, since a recent development of cloud computing environment requires a systematic combination of a higher level between communication and computing, a trend of the recent computing environment will be accelerated further.

Recently, ITU has approved LTE-Advanced and WIMAX-Advanced as a fourth generation IMT-Advanced standard. Hence, a discussion on a fifth generation mobile communication system began in earnest. ITU-R WP5D in charge of IMT, which is an international mobile communication standard, is conducting many activities to attract attention for the fifth generation communication including a Workshop in a regional unit, which is held in 2011 in the name of "IMT for the Next Decade", and the like. Besides, WWRF has published a first report by performing a study on system requisites and vision of a NG-Wireless system.

As communication service environment has considerably changed in past 10 years, it may be very difficult to anticipate changes for the upcoming 10 years. Currently, such communication standard organizations as ITU-R, WWRF and the like consider following elements of changes for the 5G communication environment targeting in a year of 2020.

Development of a multimedia service centering on a high-definition video service Provision of a differentiated UX (User eXperience) via a personalized service: provision of a service suitable for a personal preference, a situation, an equipment and the like Change from device-centered communication environment to user-centered communication environment: As a user possesses a plurality of communication devices, provision of a user-centered service is required. Such services as sharing content, provision of seamless mobility between heterogeneous network, security, and the like is provided.

Expanding an M2M service: According to traffic increase due to the increase of M2M devices, provision of a new M2M based service is required.

Expanding the base of mobile cloud computing environment: a mobile cloud computing is provided via provision of communication environment of less latency and high performance, which are enabled in a manner that all communication environments are combined with a network.

According to the aforementioned changes of the service environment, core requirements of the 5G communication system in the following are discussing.

1. Bandwidth/Transfer Rate Increase

Various analysis reports have anticipated that mobile device and traffic will increase for the upcoming 10 years with a size bigger than before. In case of the mobile device, although increase of population is not big, it is anticipated that a low-end user equipment is replaced with such an internet user equipment as a smartphone, a tablet and the like and the number of connected user equipment such as an M2M will rapidly increase.

According to a report of Cisco, the amount of total mobile traffic has increased 6 times more for a period from 2008 to 2010 and the report anticipates that the amount of total mobile traffic will increase 26 times more until the year of 2015 and will be 6.3 EB (Exabyte, 1018=260 bytes) monthly [3]. UMTS Forum anticipates that the amount of total mobile traffic will be 127 EB in the year of 2020, which corresponds to 33 times of 3.8 EB in the year of 2010, in a manner of referring to material of IDATE. During the period, the number of mobile terminal is anticipated to be increased to 10 billion from 5 billion.

From the aforementioned trend, it is able to know that the first target of the fifth generation mobile communication system is to increase transfer rate. There are various methods to increase the transfer rate. A first available method may correspond to a method of discovering an additional bandwidth currently not in use and using the additional bandwidth.

A current mobile communication system mainly uses a band less than 3 GHz. Yet, due to a limitation of a bandwidth, a study on a higher band is progressing. In particular, a study on securing system performance according to a modified frequency characteristic in a high frequency band of 2~6 GHz band is progressing as well.

2. Provision of Uniform Service Quality

In terms of a transmission speed, a 4G communication system has shown much improvement such as implementation of maximum 1 Gbps transmission speed and the like. Yet, a unbalance problem of service quality including a difference more than 30 times between spectrum efficiency in a cell boundary and an average spectrum efficiency of a cell and the like is serious. Due to a motto "provision of a preferred service at anytime and anywhere" required by a 5G communication system, improvement for the unbalanced service quality may become a very important requirement.

In relation to this, although a study on performance enhancement for a cell boundary region is progressing via such technologies as WIFI offloading in a 4G system, a method of adding an assistive cell such as Femto BS and the like, eICIC (Enhanced Inter-cell Interference Coordination), COMP (Coordinated Multi-Point) and the like, it is necessary to provide a uniform service of a higher level.

3. User-Centered Systematic Interworking

In a 4G system, interworking between devices is implemented based on an operation of a user or a determined policy. Yet, in a next generation communication system, technologies used for providing a service of an identical level in various communication environments including systematic interworking between many devices are required together with diversification of a user device. Technologies enabling such technologies as a cellular and a wireless LAN to be systematically interworked with each other without a complex process and technologies providing an optimized service in a best environment via seamless provision of all services while minimizing a human involvement are required.

In order to satisfy the aforementioned requirements, various studies are progressing. In particular, various studies on a communication network field are also progressing.

As a user equipment moves, a handover is necessary in a C-RAN system as well. However, a handover procedure in C-RAN based environment has not been studied yet. It is necessary to newly define a handover procedure in the C-RAN environment corresponding to a new communication system.

DISCLOSURE OF THE INVENTION

Technical Tasks

A technical task intended to achieve by the present invention is to provide a method for a user equipment to perform a handover in a C-RAN system.

Another technical task intended to achieve by the present invention is to provide a user equipment device performing a handover in a C-RAN system.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of performing a handover by a user equipment in a C-RAN (cloud radio access network) system, includes receiving information on at least one candidate RRH (remote radio head), measuring reception signal strengths of a serving cell of the at least one candidate RRH and the user equipment and if a prescribed relationship between a reception signal strength of a serving RRH of the user equipment and a reception signal strength of the serving cell is satisfied as a result of the measuring, transmitting feedback information including the result of the measuring to the serving RRH. The prescribed relationship corresponds a relationship in which the reception signal strength of the serving RRH is greater than or equal to a predetermined first threshold and a difference between the reception signal strength of the serving cell and the reception signal strength of the serving RRH is less than or equal to a predetermined second threshold. The at least one candidate RRH includes an RRH communicating with the serving RRH and the user equipment.

The method can further include receiving information on a changed serving RRH from the serving RRH. The changed primary RRH corresponds to an RRH including strongest reception signal strength among the result of the measuring.

The method can further include receiving information on a CSI-RS antenna port from a base station, the CSI-RS antenna port is distinguished per RRH. The measurement for the at least one candidate RRH is performed in a manner of distinguishing RRH based on the CSI-RS (channel state information-reference signal) antenna port, the CSI-RS antenna port is distinguished per candidate RRH. The information on the changed serving RRH may further include information indicating whether to activate or de-activate the at least one candidate RRH.

To further achieve these and other advantages and in accordance with the purpose of the present invention, a user equipment of performing a handover in a C-RAN (cloud radio access network) system includes a receiver, a transmitter and a processor, the processor configured to control the receiver to receive information on at least one candidate RRH (remote radio head), the processor configured to measure reception signal strengths of a serving cell of the at least one candidate RRH and the user equipment, the processor, if a prescribed relationship between a reception signal strength of a serving RRH of the user equipment and the reception signal strength of the serving cell is satisfied as a result of the measuring, configured to control the transmitter to transmit feedback information including the result of the measuring to the serving RRH. The prescribed relationship corresponds to a relationship in which the reception signal strength of the serving RRH is greater than or equal to a predetermined first threshold and a difference between the reception signal strength of the serving cell and the reception signal strength of the serving RRH is less than or equal to a predetermined second threshold. The processor is configured to control the receiver to receive information on a CSI-RS antenna port, the CSI-RS antenna port is distinguished per RRH. The processor is configured to perform the measurement for the at least one candidate RRH in a manner of distinguishing RRH based on a CSI-RS (channel state information-reference signal) antenna port, the CSI-RS antenna port is distinguished per candidate RRH.

Advantageous Effects

A communication performance can be considerably enhanced in a manner of efficiently performing a handover between RRHs by a method for a user equipment to perform a handover in a C-RAN (Cloud Radio Access Network) system according to embodiment of the present invention.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
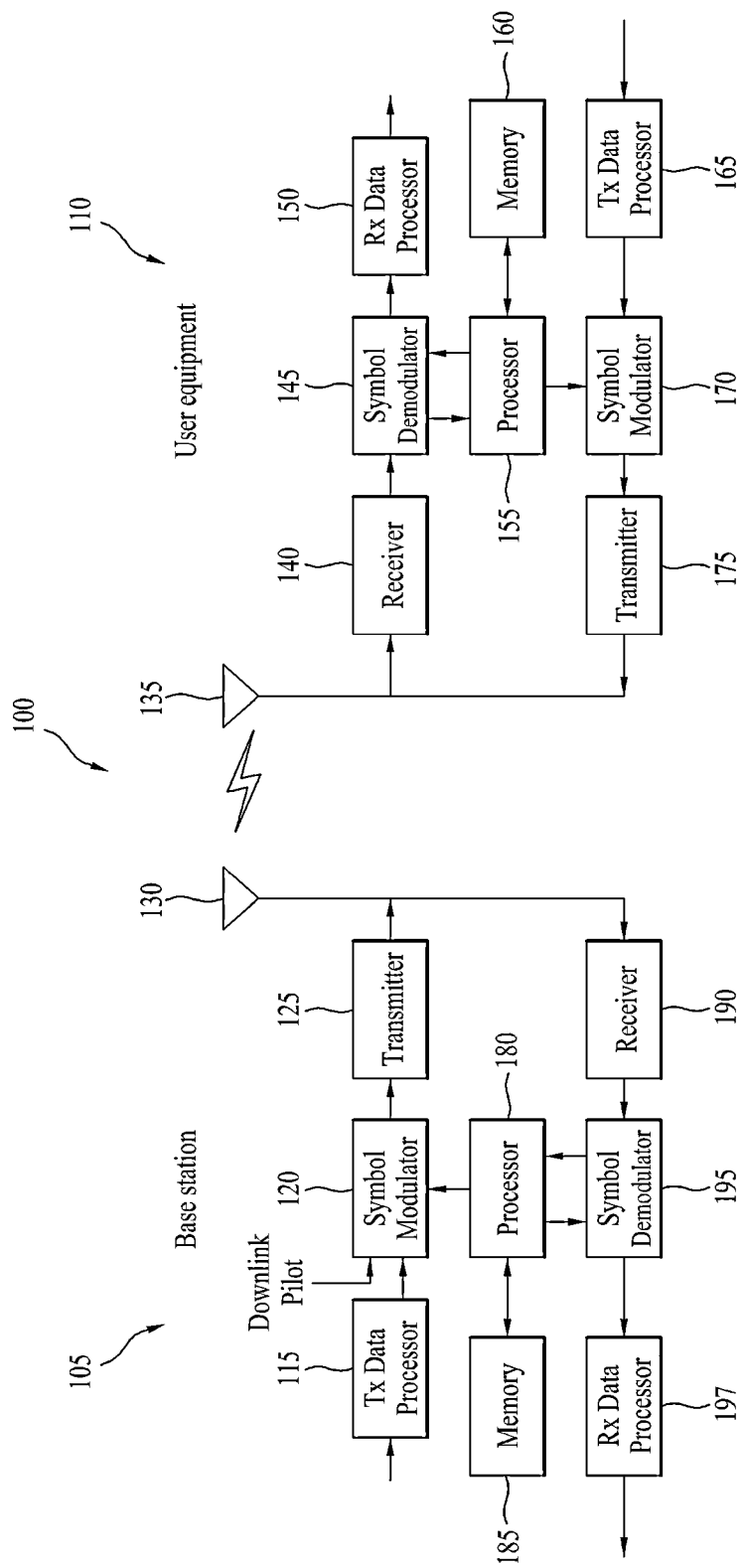
FIG. 1 is a block diagram for a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE/LTE-A system, they are applicable to other random mobile communication systems except unique features of 3GPP LTE/LTE-A system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like. Although the present specification is explained on the basis of IEEE 802.16 system, contents of the present invention can also be applied to various communication systems except the IEEE 802.16 system.

In a mobile communication system, a user equipment may be able to receive information from a base station in downlink and transmit the information to the base station in uplink. The informations transmitted or received by user equipment may include data and various control informations. And, various kinds of physical channels may exist in accordance with types and usages of the informations transmitted or received by the user equipment.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (WIFI), IEEE 802.16 (WIMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

Specific terminologies used in the following description are provided to help understand the present invention. The use of the specific terminology can be modified into a different form in a range of not deviating from the technical idea of the present invention.

FIG. 1 is a block diagram for a configuration of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 according to the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, performs coding on the received traffic data by formatting, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero (i.e., null). In each of symbol durations, pilot symbols may be contiguously transmitted. In doing so, the pilot symbols may include symbols of frequency division multiplexing (FDM), orthogonal frequency division multiplexing (OFDM), time division multiplexing (TDM), or code division multiplexing (CDM).

The transmitter 125 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the user equipment via the transmitting antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, obtains data symbol estimated values (i.e., estimated values of the transmitted data symbols) by performing data modulation on the received data symbols, and then provides the data symbol estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

Regarding the user equipment 110 in uplink, the transmitted data processor 165 provides data symbols by processing the traffic data. The symbol modulator 170 provides a stream of symbols to the transmitter 175 by receiving the data symbols, multiplexing the received data symbols, and then performing modulation on the multiplexed symbols. The transmitter 175 generates an uplink signal by receiving the stream of the symbols and then, processing the received stream. The generated uplink signal is then transmitted to the base station 105 via the transmitting antenna 135.

In the base station 105, the uplink signal is received from the user equipment 110 via the receiving antenna 130. The receiver 190 obtains samples by processing the received uplink signal. Subsequently, the symbol demodulator 195 provides pilot symbols received in uplink and a data symbol estimated value by processing the obtained samples. The received data processor 197 reconstructs the traffic data transmitted from the user equipment 110 by processing the data symbol estimated value.

The processor 155/180 of the user equipment/base station 110/105 directs operations (e.g., control, adjustment, management, etc.) of the user equipment/base station 110/105. Each of the processor 155/180 may be connected to the memory unit 160/185 configured to store program codes and data. The memory 160/185 is connected to the processor 180 to store operating systems, applications and general files.

In the present invention, the processor 155 of the user equipment and the processor 180 of the base station perform an operation of processing a signal and data except a function of receiving or transmitting a signal performed by the user equipment 110 and the base station 105, respectively. Yet, for clarity, the processor 155/180 is not separately mentioned in the following description. Although there is no special citation for the processor 155/180, the processor can perform a series of operations including data processing, control and the like instead of transmitting or receiving a signal.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment and a base station may be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A user equipment and a base station may be able to exchange RRC messages with each other via a radio communication network using RRC layers.

In the present invention, the processor 155 of the user equipment and the processor 180 of the base station perform an operation of processing a signal and data except a function of receiving or transmitting a signal performed by the user equipment 110 and the base station 105, respectively. Yet, for clarity, the processor 155/180 is not separately mentioned in the following description. Although there is no special citation for the processor 155/180, the processor can perform a series of operations including data processing, control and the like instead of transmitting or receiving a signal.

A development direction of a 5G communication network can be mainly divided into a wireless network field and a core network field. There exist two main streams in the wireless access network field. First of all, one main stream corresponds to a centralized access network via introduction of a network cloud. Three core technologies enabling the network cloud correspond to an RRH (remote radio head)/COMP (coordinated multi-point) technology, a software modem technology and a cloud computing technology.

The core, which has enabled the network cloud in the wireless access network field, is an introduction of an RRH. The RRH is a very important element in terms of a wireless transmission. Moreover, the RRH works as a motive causing an innovative change of a structure of a wireless access network.

Figure 2:
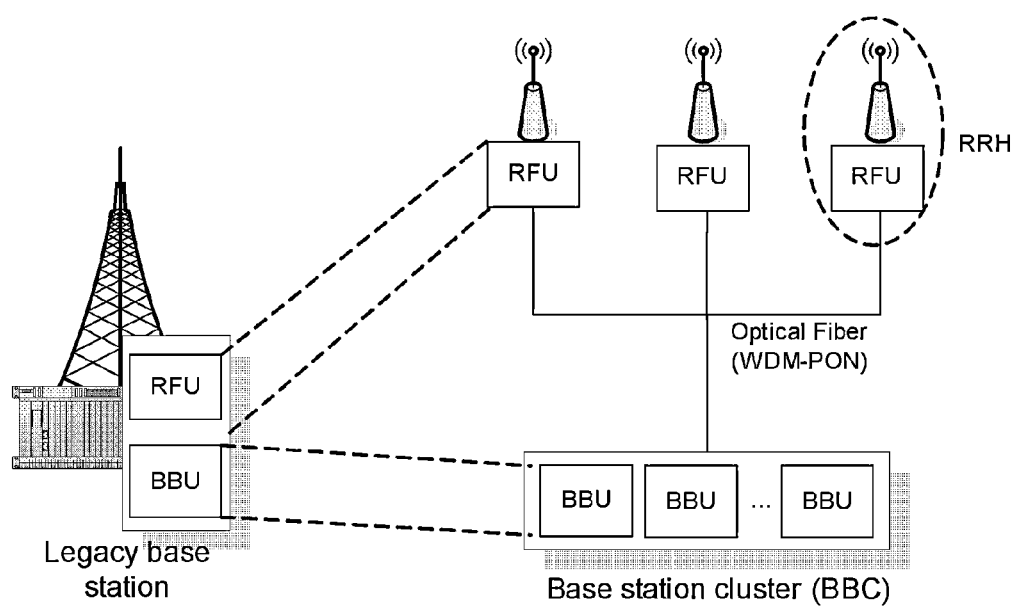
FIG. 2 is a diagram for explaining an example of an RRH concept and a change of a base station/RAN structure via an RRH.

FIG. 2 is a diagram for explaining an example of an RRH concept and a change of a base station/RAN structure via an RRH.

Although an RRH is originally developed as one type of an optical repeater, the RRH is used as a core element of a centralized base station implementation. The core, which has enabled the network cloud in the wireless access network field, is an introduction of the RRH. The RRH is a very important element in terms of a wireless transmission. Moreover, the RRH works as a motive causing an innovative change of a structure of a wireless access network. Due to the introduction of the RRH, a legacy base station is physically divided into a RFU (radio frequency unit) and a BBU (baseband unit). Hence, it is not necessary for a physical base station to exist anymore in a manner of being distributed. In case of a recently introduced cloud access network, the network can be managed in a manner that single equipment is interworking with hundreds of RRHs. Consequently, a cell different from a concept of a conventional cell is formed.

Until a 4G communication system, operations of all wireless accesses are defined based on a cell. Yet, due to the aforementioned structural change, it is necessary to newly establish a concept of a cell. A current 3GPP is discussing on various implementation scenarios via Release 11 COMP (coordinated multi-point) Work Item in a situation that an RRH and a macro base station coexist. Recently, like a SAS (shared antenna system), a study of a concept of sharing a single RRH by a plurality of cells is progressing. And, a study of a concept of dynamically changing a cell region by controlling an RRH cluster according to a situation is also progressing. In these trends, an interest in a recently proposed C-RAN (cloud radio access network) project is considerably increasing.

Figure 3:
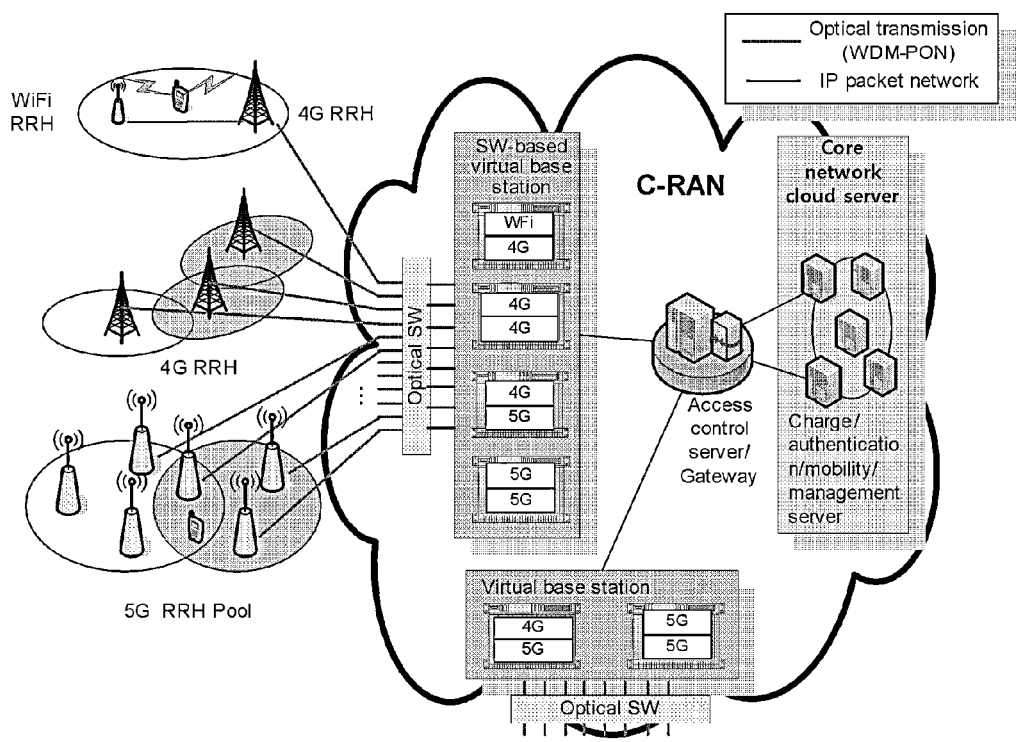
FIG. 3 is a diagram for an example of a concept of a cloud network based on a C-RAN.

FIG. 3 is a diagram for an example of a concept of a cloud network based on a C-RAN.

FIG. 3 shows a concept of a C-RAN. The C-RANS can include a plurality of RRHs, a software (SW) based virtual base station (VBS), an access control server controlling the VBS and a core network cloud server (a resource management server, a charge/authentication server and the like). As mentioned in the foregoing description, as elements of a core network are changing to an open IP network, various elements of the C-RAN are directly interworking with the elements of the core network in a systematic relationship.

As shown in FIG. 3, a plurality of the RRHs access the virtual base station (VBS) via an optical access equipment. The VBS is implemented by software and may be implemented by various wireless access technologies including LTE (long term evolution), HSPA, WIMAX/WIFI and the like. One or a plurality of the RRHs are controlled by the VBS in a manner of being bound together. Conventionally, a cell region used to be fixed. Yet, a cell can be dynamically allocated in a manner of dynamically changing an RRH cluster in the C-RAN. The dynamic allocation can be controlled according to users distributed in a region. Hence, it is necessary to consider a method of configuring a user-centered cell based on a current user while discarding a cell concept.

As shown in FIG. 3, a plurality of the RRHs access the VBS via an optical access equipment. The VBS is implemented by software and may be implemented by various wireless access technologies including LTE, HSPA, WIMAX/WIFI and the like. One or a plurality of the RRHs are controlled by the VBS in a manner of being bound together. Conventionally, a cell region is used to be fixed. Yet, a cell can be dynamically allocated in a manner of dynamically changing an RRH cluster in the C-RAN.

Figure 4:
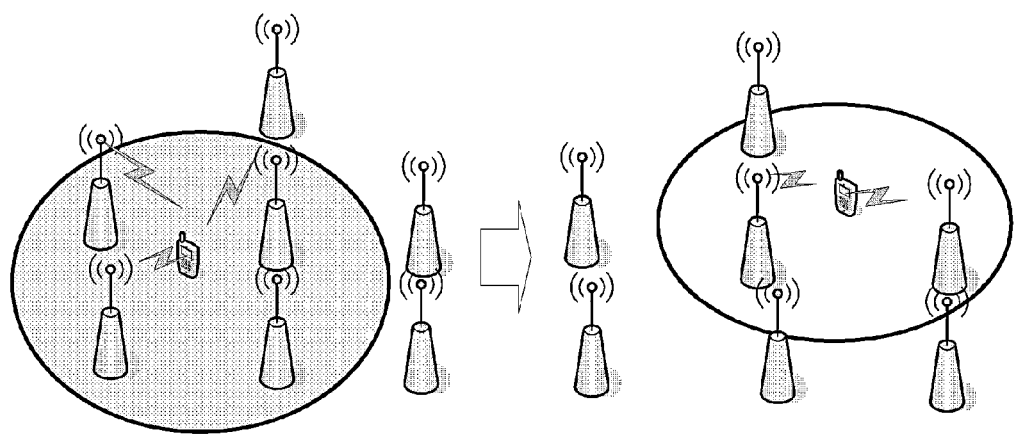
FIG. 4 is a diagram for explaining a concept of a user-centered cell.

FIG. 4 is a diagram for explaining a concept of a user-centered cell.

In the C-RAN, a cell can be dynamically allocated in a manner of dynamically changing an RRH cluster. The dynamic allocation can be controlled according to users distributed in a region. According to a certain study, a method of configuring a user-centered cell based on a current user while discarding a cell concept is progressing.

Figure 5:
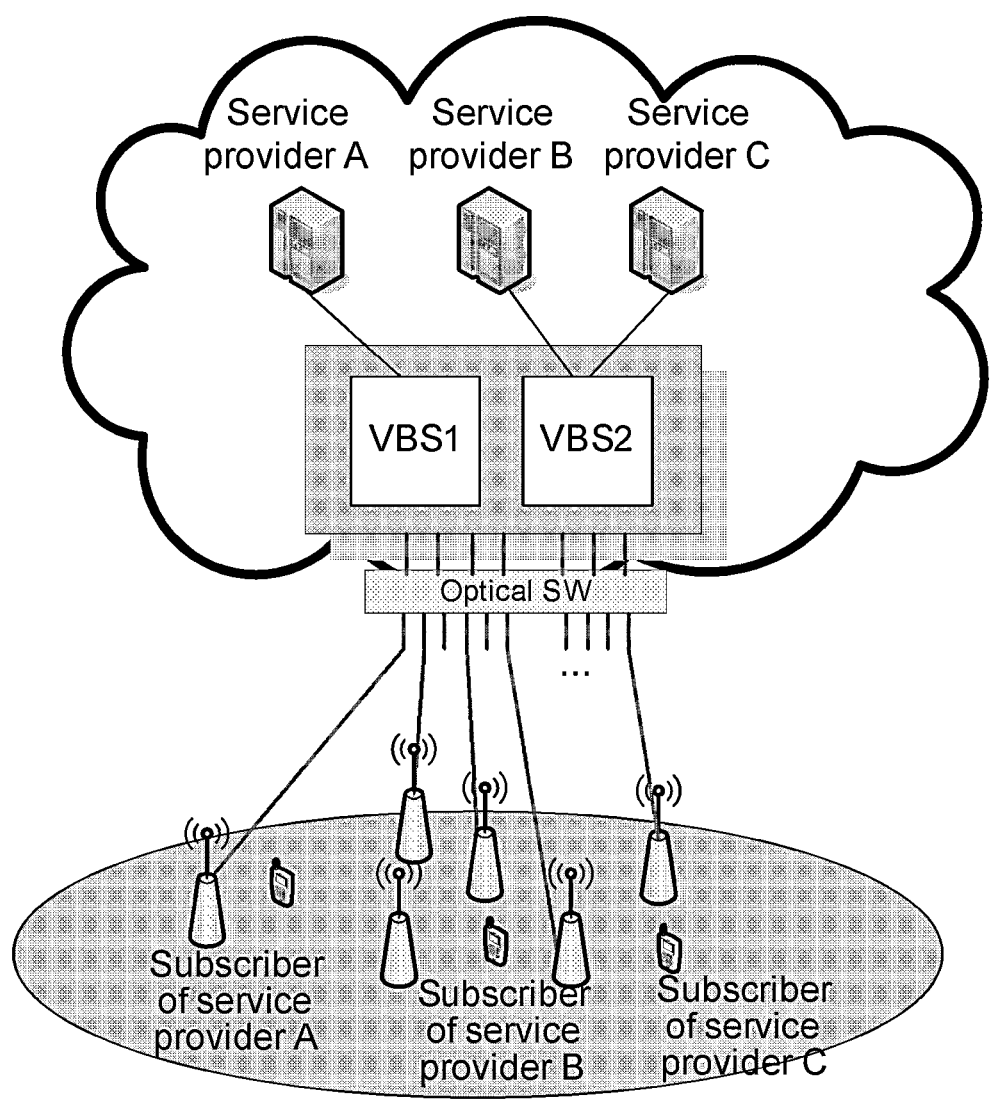
FIG. 5 is a diagram for explaining an RRH and a virtual base station sharing scenario in a C-RAN.

FIG. 5 is a diagram for explaining an RRH and a virtual base station sharing scenario in a C-RAN.

Such a virtualized structure as a C-RAN suggests a new possibility in terms of network openness and network sharing. A policy making authority of each country employs various policies to introduce element of competition of a communication market. For instance, introduction of a MVNO (mobile virtual network operator), base station/AP (access point) sharing and the like may correspond to one example of the various policies. When a virtual base station is introduced, a MVNO may configure its own virtual base station in environment in which an interface with an RRH is maintained and a plurality of MVNOs may share an identical radio resource. Hence, if the virtual base station is introduced, various service scenarios can be realized.

Referring to FIG. 5, a service provider A, B and C provide a service in a manner of sharing an identical RRH pool. In particular, the service provider B and C respectively provide services using an identical virtual base station. A service provider of the virtual base station can respectively charge the service provider B and C for a connection charge according to the use of a radio resource and each of the service providers can support subscribers in a manner of applying a resource allocation policy of its own to a determined radio resource.

Recently, a service for trading a frequency resource in real time is vitalizing with the States as the center. In a virtual base station environment, a new frequency-related business including a form of renting out a part of a frequency resource may emerge.

Another main stream corresponds to strengthening of a distributed hierarchy. Although centralization of a wireless access network and a central processing function are reinforced via a C-RAN, there exists a limitation for a capacity of a virtual base station or an access server of the C-RAN. In fact, in case of such a base station accessed via a private IP as a femto base station, it is difficult to perform an integrated management in real time. In case of a D2D (device-to-device) communication, there also exists a limit for a network to control all operations. Hence, a public access network centering on the C-RAN will evolve into a centralized control structure. On the contrary, such a locally occurring communication as a femto base station and a D2D communication will have a distributed control structure.

Figure 6:
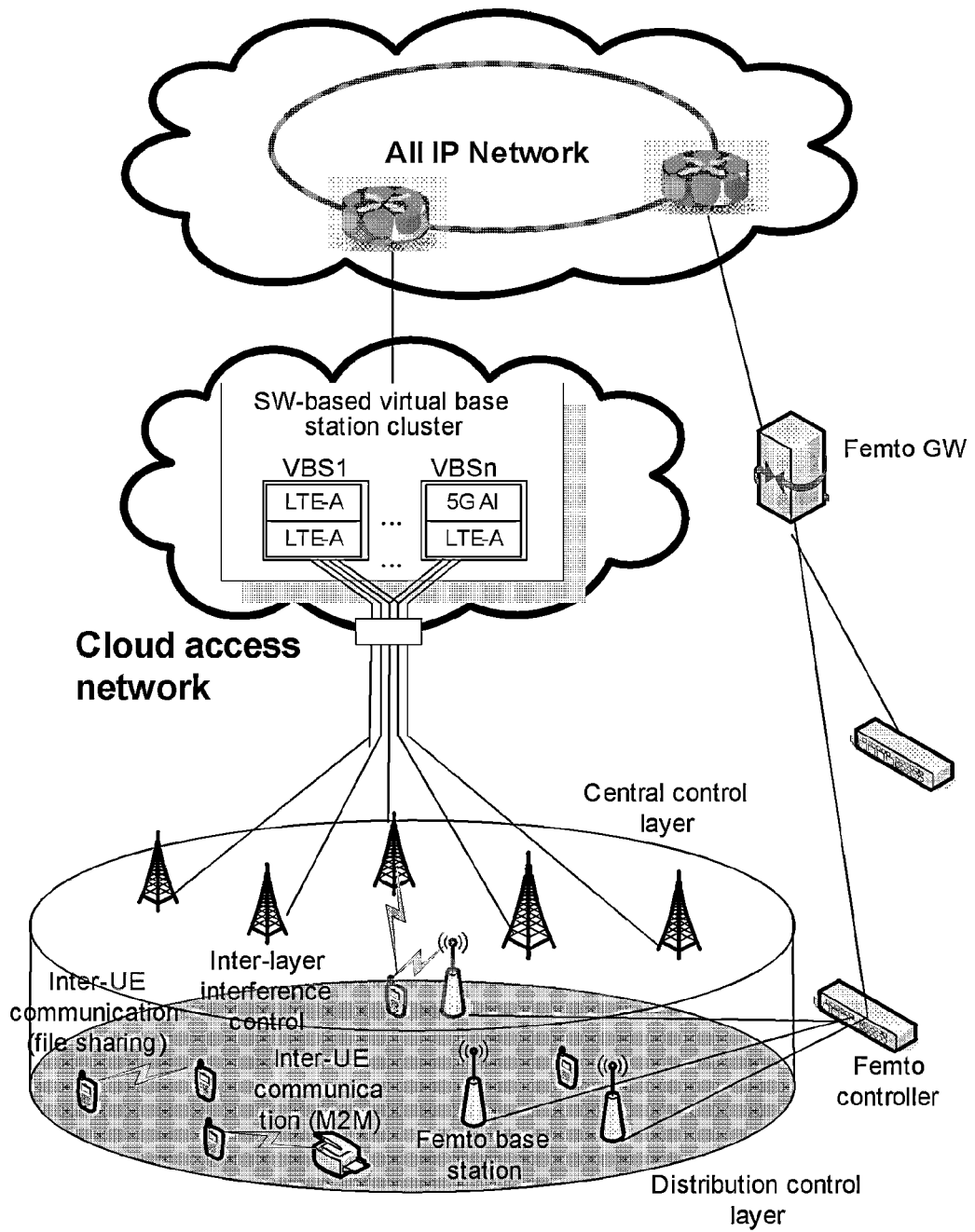
FIG. 6 is a diagram for a model of multiple control layers.

FIG. 6 is a diagram for a model of multiple control layers.

There may exist a central control layer controlled by a cloud access network and a distributed control layer generally controlled by an individual communication entity although a part of the distributed control layer is controlled by the central layer. A study of an interference control for coexistence between layers will become important in the model of the multiple control layers.

In a core network part, it is expected that evolving into an All IP-based open network will be accelerated in terms of continuity of a 4G system. According to a recent trend, many services are changing from such a network service provider-centered service as IMS to a web/application layer service. This can be checked by a confrontation between a service provider-centered RCS (rich communication suite) and a service provider-centered OTT (over the top) service. Although it may be too early to make a conclusion, OTT services such as KAKAO TALK and SKYPE will gradually replace an SMS, an MMS of a communication company and IMS-based RCS services.

In particular, this trend will be more and more accelerated via vitalization of HTML 5 corresponding to a next generation web standard and a mobile cloud service. A function of a core network will be focused to a provision of IP transport for a wireless network in a manner of reflecting a change of a service category. And, it is anticipated that a legacy hierarchical network structure centering on an audio service will be developed to a more horizontal IP network. Consequently, many conventional network elements will be simplified and a structure depending on a large server will be implemented by a plurality of core network cloud servers instead. By doing so, it may be implemented via less CAPEX/OPEX.

Besides provision of a service, a recent main issue of a core network corresponds to provision of IP flow mobility. 3GPP SA2 standardized such technologies supporting a heterogeneous network as MAPCON (multi-access PDN connectivity), IFOM (IP flow mobility) or the like. A main purpose of the technologies is to offload via interworking with WLAN. On the contrary, in addition to the introduction of the C-RAN, it is expected that IP-based mobility control is to be very simple since an interworking structure between heterogeneous networks is simplified. Conventionally, a service is used to be provided via two PDNs different from each other. Yet, the service will be implemented by a single method irrespective of all wireless access schemes via interworking between an access control server of the C-RAN and an integrated mobility control server of a core network. And, an ANDSF (access node discovery and selection function) server, which is introduced for an offloading policy, is likely to be simplified in a manner of being easily included in a region of the mobility control server of the core network.

In addition, as intelligence of information devices is recently accelerated, management elements, which are used to be limited to a radio characteristic of a user equipment, a type of traffic, charge, authentication and the like, will be variously evolved. A personal smartphone will collect information on various situations such as a location of a person, a pattern of use, a pattern of movement, interest, biometrics and the like as well as basic information and a network will be able to provide a user-centered service using the aforementioned informations. To this end, a function of collecting and processing Big Data will be added to a core network and reinforced. A legacy core network provides a service on the basis of a policy of a service provider. On the contrary, a core function of a next generation communication network may correspond to provision of a user-centered service, which is provided via collection, analysis and processing of Big Data.

In particular, as interworking between heterogeneous networks becomes very easy, providing an optimized wireless access in a manner of analyzing the Big Data according to a situation will become an important requirement for both a network service provider and a user. And, a significance of a study of a technical field related to the provision of the optimized wireless access will gradually increase as well.

Figure 7:
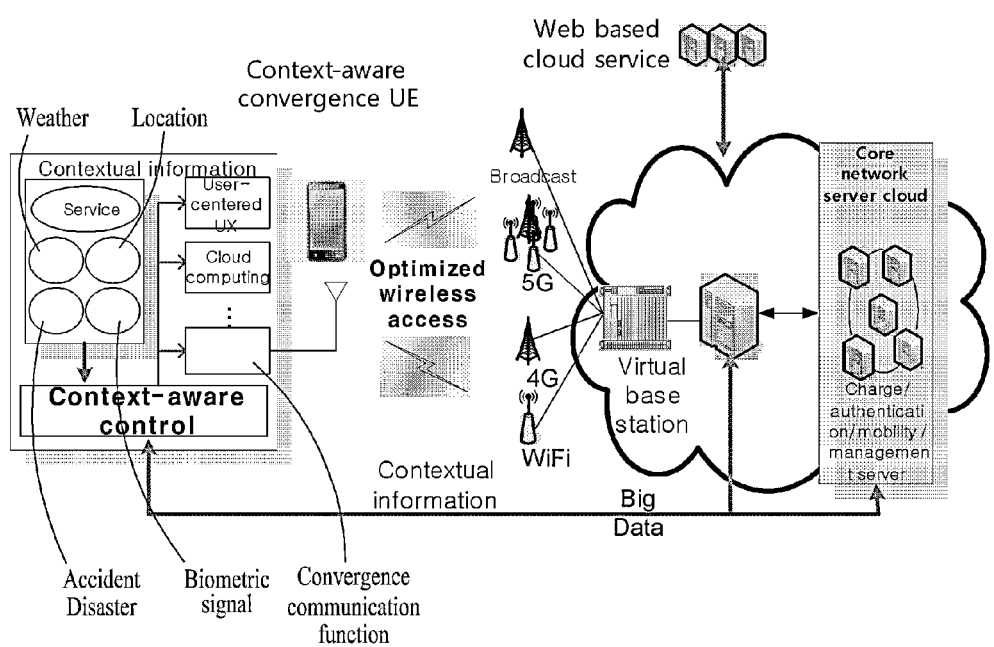
FIG. 7 is a diagram for a structure of a next generation network supporting a context-aware based intelligent interworking.

FIG. 7 is a diagram for a structure of a next generation network supporting a context-aware based intelligent interworking.

A plurality of informations collected by a user equipment are delivered to an access network server and a core network server. Based on this, a structure of a next generation network will become a structure controlling optimized access environment of the user equipment.

A prospect of a network evolution for a next generation communication system is explained in terms of a wireless access network and a core network. Expandability and flexibility of the wireless access network will be reinforced according to evolution into a cloud network. And, as a control region is expanded due to centralization, many communication-related functions of a legacy core network will be implemented in a manner of being integrated with the access network. On the contrary, the core network will be developed to an intellectual side and will provide an intelligent access control function and an interworking control function based on various contextual informations collected by a user, the access network and other environmental elements. Searching for a direction for a fifth generation communication is in an initial stage. As new technologies of a bio, a nano field and the like as well as IT technologies are emerging, a wireless communication technology of a new form can be developed.

One of main changes of a cloud RAN (C-RAN) is a change of a handover (HO) concept. In particular, a legacy HO between cells is changed to a switching between RRH nodes. Due to the change, a handover procedure in the C-RAN may be different from a legacy handover procedure between cells.

Figure 8:
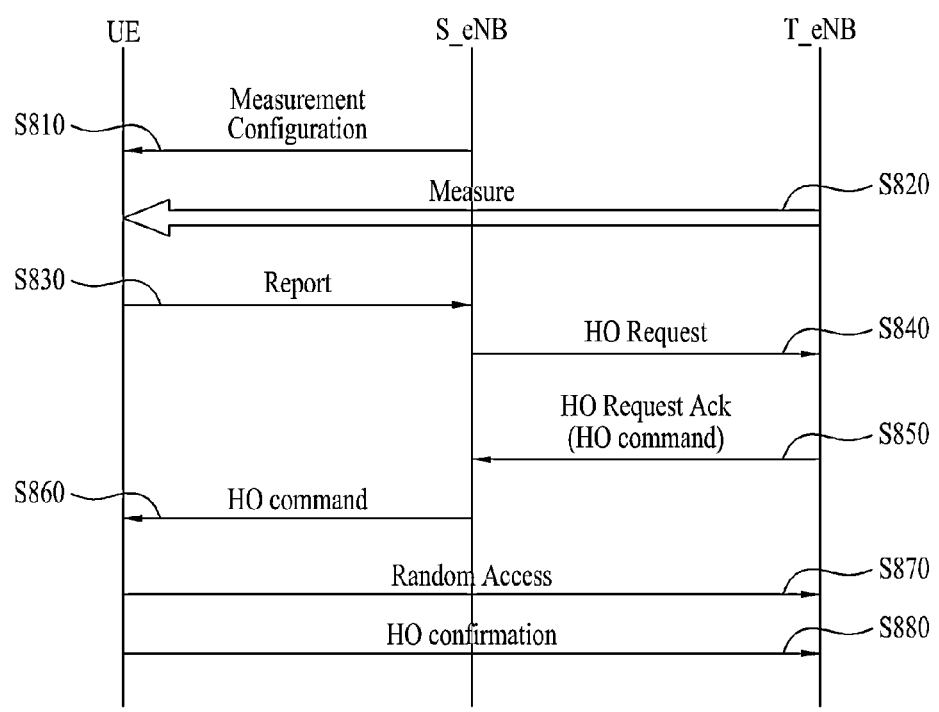
FIG. 8 is a flowchart for explaining a legacy X2 based handover procedure.

FIG. 8 is a flowchart for explaining a legacy X2 based handover procedure.

As shown in FIG. 8, a serving base station (S_eNB) can set a measurement configuration to a user equipment [S810]. When a measurement for a neighboring cell is configured by the measurement configuration, if a specific situation is satisfied, the user equipment starts to measure [S820]. Subsequently, the user equipment reports a measurement result to the serving base station (S_eNB) in a specific situation [S830]. The serving base station (S_eNB) makes a request for a handover to a target base station (T_eNB) according to a result of the report [S840]. The target base station (T_eNB) sends a handover request response message including a handover command (HO command) to the serving base station (S_eNB) in response to the handover request [S850]. Subsequently, the serving base station (S_eNB) transmits a message including the handover command (HO command) to the user equipment [S860]. A handover occurs via negotiation between the serving base station (S_eNB) and the target base station (T_eNB) in a manner of performing the aforementioned procedures. Subsequently, the user equipment attempts a random access to the target base station (T_eNB) [S870]. Subsequently, the user equipment transmits a handover confirmation (HO confirmation) message to the target base station (T_eNB) [S880].

The aforementioned procedure can be divided into an S1-based handover centering on an MME and an X2-based handover performed by negotiation between base stations. FIG. 8 is explained in a manner of assuming the x2-based handover.

C-RAN Based RRH Switching

A handover in a C-RAN is similarly performed. A plurality of RRHs are connected to a virtual base station (VBS) in the C-RAN and a user equipment changes an RRH only without changing a base station. Basically, since it is able to assume joint transmission (JT)/joint reception (JR) and the like in an RRH situation, the user equipment can perform seamless handover.

Figure 9:
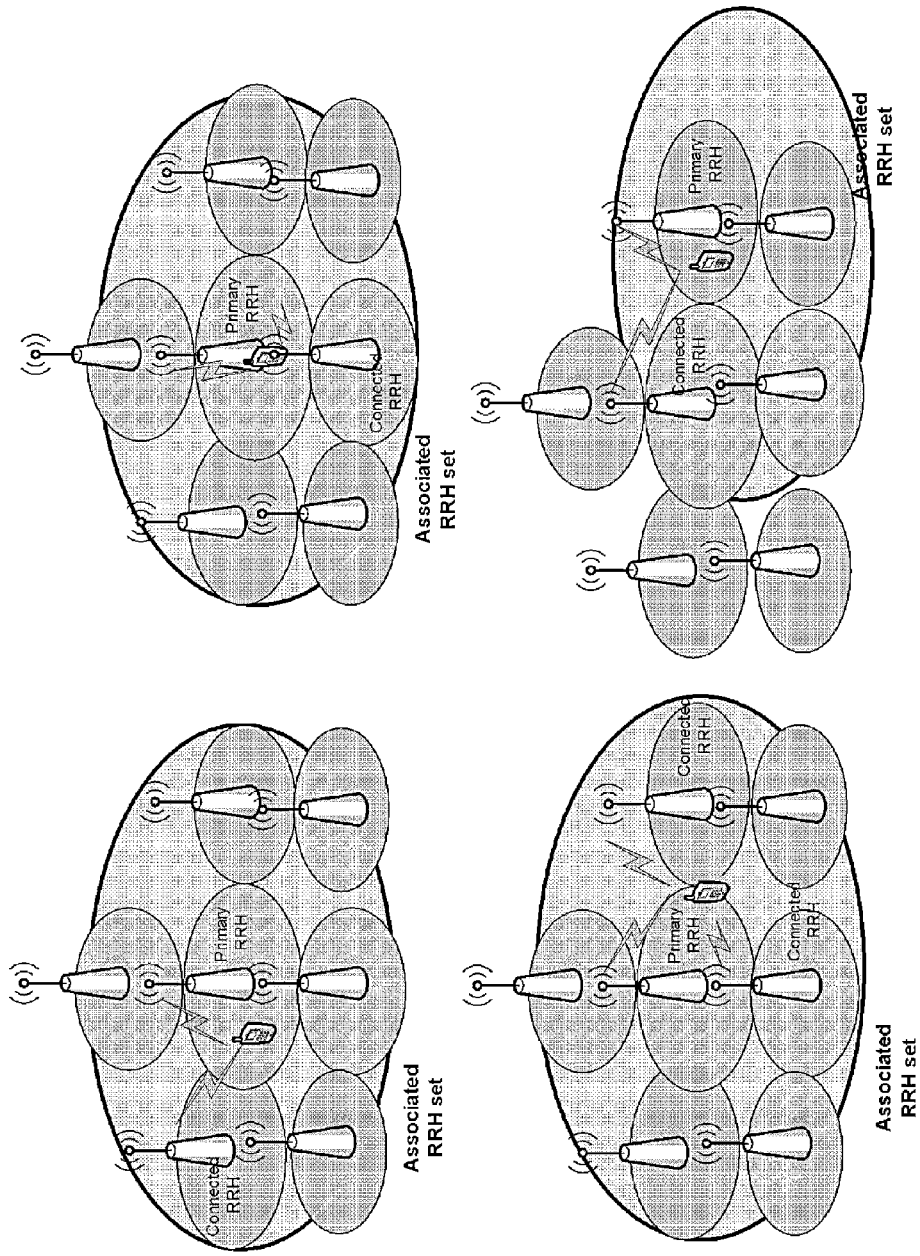
FIG. 9 is a diagram for explaining a method of supporting mobility via RRH node switching in a C-RAN.

FIG. 9 is a diagram for explaining a method of supporting mobility via RRH node switching in a C-RAN.

RRH sets (associated RRH set, connected RRH set) are included in a cell. A cell configuration can be configured by two scenarios based on an identifier. As a first scenario, a PHY cell id corresponds to a MAC cell id, a cell is classified according to a synchronization channel of a base station and an RRH can be classified according to an antenna port using a CSI-RS. As a second scenario, a PHY cell id! corresponds to a MAC cell id, a cell is classified according to a logical cell ID and an RRH can be classified according to a synchronization channel.

One primary RRH and a serving cell in a legacy cellular system may correspond to an identical concept. In general, the primary RRH is configured by an RRH of a strongest reception signal in downlink.

Connected RRH of 1~n (e.g., 2 or 3): connected RRHs correspond to RRHs actually participating in transmitting and receiving data. The connected RRHs are allocated by a base station. Generally, activation/de-activation is achieved using a MAC control element (e.g., signaling header) and a user equipment regularly performs MIMO (multiple input multiple output)-related measurement/report via a CSI-RS and the like.

1~m (m (4~8)>=n) associated RRH set: an associated RRH set corresponds to a set of RRHs monitored by a user equipment periodically or according to a situation. The associated RRH set corresponds to candidate RRHs capable of being become the connected RRH. A primary RRH can inform a user equipment of the associated RRHs in a manner of transmitting an RRH list to the user equipment. Or, if a specific Global CSI-RS port is allocated to each RRH, the user equipment can classify an RRH using a corresponding port. When a measurement configuration is set according to the aforementioned separately allocated unit, a base station can perform measurement and report in accordance with the configuration.

In C-RAN environment, in particular, an operation for a C-RAN based RRH switching handover is similar to a legacy handover operation. As shown in FIG. 9, there exist a connected RRH set and an associated RRH set in a user equipment. In the present specification, the connected RRH sets correspond to a set of RRHs capable of performing a communication at any time since joint transmission/joint reception (JT/JR) is currently available. The associated RRH set corresponds to a set of RRHs including the connected RRH and performing a measurement. The associated RRH set is defined as candidate RRHs.

Measurement for the RRHs can be performed in various ways. Regarding this, it shall be described later. A primary RRH exists among the connected RRHs. The primary RRH corresponds to an RRH always communicating with a user equipment like a serving cell. As shown in FIG. 9, if the user equipment moves, the primary RRH and several connected RRHs participate in a communication and an RRH among the several connected RRHs may become a new primary RRH according to the movement of the user equipment. An associated RRH set may be allocated by a base station. Or, the primary RRH may broadcast the associated RRH set to the user equipment.

Primary RRH Switching Process in a C-RAN

Figure 10:
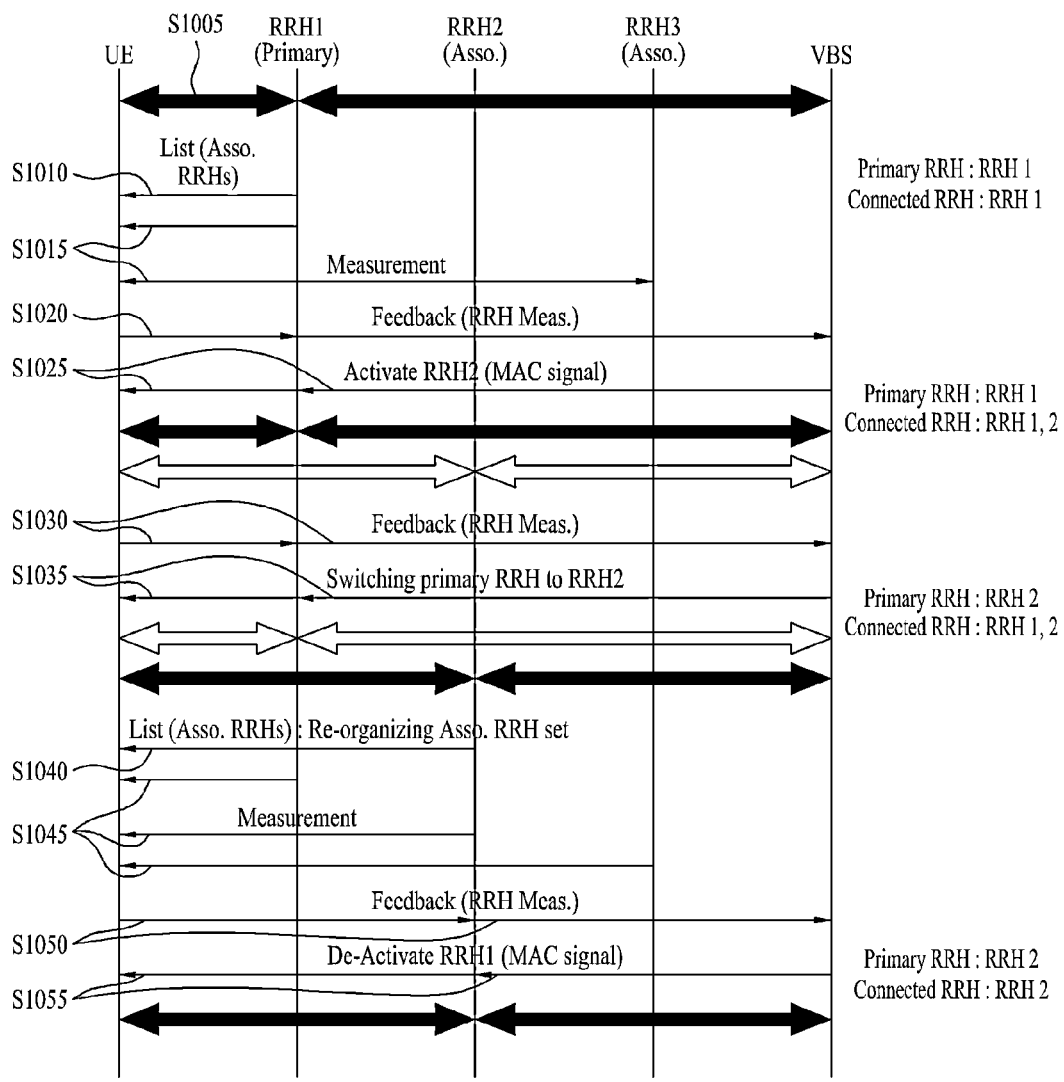
FIG. 10 is a flowchart for an example of an RRH switching process according to a movement of a user equipment in a C-RAN according to the present invention.

FIG. 10 is a flowchart for an example of an RRH switching process according to a movement of a user equipment in a C-RAN according to the present invention.

As a user equipment moves in a C-RAN, a handover is required. This corresponds to a primary RRH switching process. As shown in FIG. 10, an RRH 1 is a primary RRH for the user equipment (UE) and the user equipment transceives data with the RRH 1 [S1005]. In this case, assume that the RRH 1 is a connected RRH only. If it is determined that a handover is required, the primary RRH informs the user equipment of an associated RRH list corresponding to candidate RRHs [S1010]. The user equipment performs measurement for associated RRHs according to information configured by the primary RRH [S1015] and transmits a measurement result to the primary RRH (RRH 1) as feedback information. Subsequently, the primary RRH delivers the received feedback information to a virtual base station [S1020]. A cell selection/re-selection process is performed according to the feedback information. In the step S1020, the user equipment can transmit the feedback information in a manner of including an activation command of an RRH 2 in the feedback information based on the measurement result.

Subsequently, the base station can transmit a MAC signal indicating that the RRH 2 is activated to the RRH 1 and the RRH 1 can deliver the MAC signal to the user equipment [S1025]. In this case, the RRH 1 and the RRH 2 are included in the connected RRH at this time. At the time of activation, the user equipment performs additional measurement including CQI (channel quality information), PMI (precoding matrix index) and the like and can feedback a result of the additional measurement to the RRH 1, which is the primary RRH, and the RRH 1 can deliver the result of the additional measurement to the base station [S1030].

Subsequently, the base station transmits a signal indicating that the primary RRH is changed from the RRH 1 to the RRH 2 to the RRH 1 and then the RRH 1 can deliver the signal to the user equipment [S1035]. Now, the RRH 2 becomes the primary RRH and the RRH 1 and the RRH 2 are still included in the connected RRH.

Subsequently, the RRH 2 can transmit the associated RRH list to the user equipment by updating the associated RRH list [S1040]. Subsequently, similar to the step S1010, the user equipment measures [S1045] and reports [S1050] feedback information to the RRH 2 based on the updated associated RRH list and can perform an RRH handover (or switching) operation according to the feedback information. In this case, the feedback information can be transmitted in a manner of including a command for de-activating the RRH 1 based on the measurement result. And then, the base station transmits a MACK signal indicating that the RRH 1 is deactivated to the RRH 2 and the RRH 2 can deliver the MACK signal to the user equipment [S1055]. Now, the RRH 2 is included in the connected RRH only.

In the following description, cell selection/re-selection (or RRH selection/re-selection) and measurement for a handover between cells (or a handover between RRHs) are explained in detail.

Cell Selection/Re-Selection (RRH, Selection/Re-Selection)

When both existence of a cell and existence of an RRH are assumed, there exist 3 types of a cell selection procedure. Basically, a cell is selected based on a CRS (common reference signal). Instead, a RACH (random access channel) can be efficiently selected when the RACH is RRH-specifically selected. Table 1 in the following shows various methods of the cell selection (re-selection). Referring to FIG. 10, the base station delivers a fact that the RRH 2 is selected by the primary RRH to the RRH 1 and the RRH 1 can deliver the fact to the user equipment.

TABLE 1

|  | Method 1 | Method 2 | Method 3 |
|---|---|---|---|
| Cell selection criteria | CRS based | CRS based | Global CSI-RS based for the use of RRH |

TABLE 1-continued

|  | Method 1 | Method 2 | Method 3 |
|---|---|---|---|
| RACH transmission | Cell common RACH resource (cell ID based) | RACH resource for the use of RRH of strongest reception power (RRH ID based) | RRH dedicated RACH resource (RRH ID based) |
| Primary RRH | Allocated by base station | Strongest RRH | Strongest RRH |
| BCH/paging | Cell common | Cell common |  |
| Reselection parameter | Cell common | Cell common | RRH specific |

Referring to Table 1, in case of a method 1 and a method 2 as cell selection criteria, a cell is selected based on a CRS. In case of a method 3, a cell selection is performed based on a global CSI-RS for the use of RRH.

When a primary RRH is allocated, in case of the method 1, a base station allocates the primary RRH. In case of the method 2 and the method 3, an RRH of a strongest reception signal becomes the primary RRH.

When a RACH is transmitted, in case of the method 1, a user equipment transmits the RACH via a cell common RACH resource, which is allocated based on a cell ID. Meanwhile, in case of the method 2, since the RRH of the strongest reception power becomes the primary RRH, the user equipment transmits the RACH via a RACH resource (allocated based on an RRH ID) of the RRH of the strongest reception power. In case of the method 3, the user equipment transmits the RACH via an RRH-dedicated RACH resource, which is allocated based on an RRH ID, of an RRH of the strongest reception power.

When a broadcast channel (BCH)/paging is transmitted, both the method 1 and the method 2 use a common cell. When a reselection parameter is configured, in case of the method 1 and the method 2, the reselection parameter can be configured by a common cell. In case of the method 3, the reselection parameter can be specifically configured according to an RRH.

Measurement for a Handover Between Cells (Handover Between RRHs)

When a handover occurs in a C-RAN, if a global CSI-RS is allocated to an RRH, assume that the global CSI-RS is used for measuring. Assume that all RRHs within an identical cell transmit an identical CRS. Each of the RRHs can be independently measured in a manner that a global CSI-RS port different from each other is allocated to each of the RRHs.

1. Method of Measuring Handover

Cell RSRP (reference signal received power) can be determined by sum of CRSs coming from a plurality of RRHs. It may consider a method of measuring RRH RSRP using a reference signal separately allocated according to an RRH including a global CSI-RS and the like. In a C-RAN handover situation, unlike a handover between cells in a legacy cellular network, a new measurement entity or a new measurement allocation method should be defined.

2. Handover Trigger Condition

As a first method, when RSRP_cell (i.e., a measured RSRP value of the serving cell) of a serving cell is compared with RSRP_cell (i.e., a measured RSRP value of the target cell) of a target cell, if the RSRP of the target cell is greater than the RSRP of the serving cell, a handover can be triggered. Yet, in this case, if the number of RRHs belonging to a cell is different from each other according to a cell, triggering may not be fairly performed.

As a second method, there is a method of comparing an RSRP value (RSRP_RRH 1) of an RRH 1 with an RSRP value (RSRP_RRH 2) of an RRH 2. The second method corresponds to a method of which a legacy cell based concept is expanded to an RRH. Although the second method is most general method, since a radius of an RRH is small, a handover may suddenly occur or a handover may frequently occur. In order to use the second method, measurement complexity decrease or reliability of measurement should be secured according to the increase of the number of RRHs to be measured.

As a third method, there is a method of comparing sum of RSRP for n number of optimized reception RRHs belonging to each cell with each other. When COMP JT/JR (COMP joint transmission/reception) scheme is assumed, the third method can be defined by the sum of the optimized RSRP in accordance with the number as many as the number of RRHs currently received. This method has high complexity and it is difficult to measure combining gain of a plurality of RRHs.

3. New Measurement Configuration for C-RAN Handover

For a handover in C-RAN environment, an item different from a legacy item should be added to a measurement configuration. For instance, the added item may correspond to items in the following.

It is necessary to have information to be used for measuring an RRH belonging to a neighboring cell. The information to be used for measuring the RRH belonging to the neighboring cell includes global CSI-RS related information (a cell ID list used to be included). And, it is necessary to define information on a new trigger condition and information on a measuring object.

Conventionally, a user equipment used to measure RSRP and RSRQ (reference signal received quality) only.

Figure 11A:
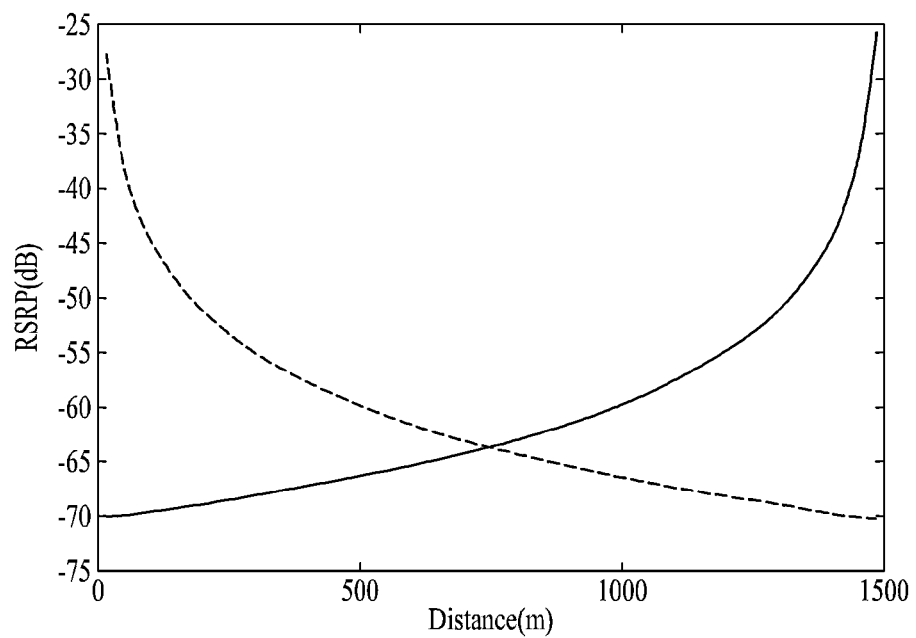
FIG. 11A and FIG. 11B are diagrams for a change of RSRP of a cell according to a movement of a user equipment.
Figure 11B:
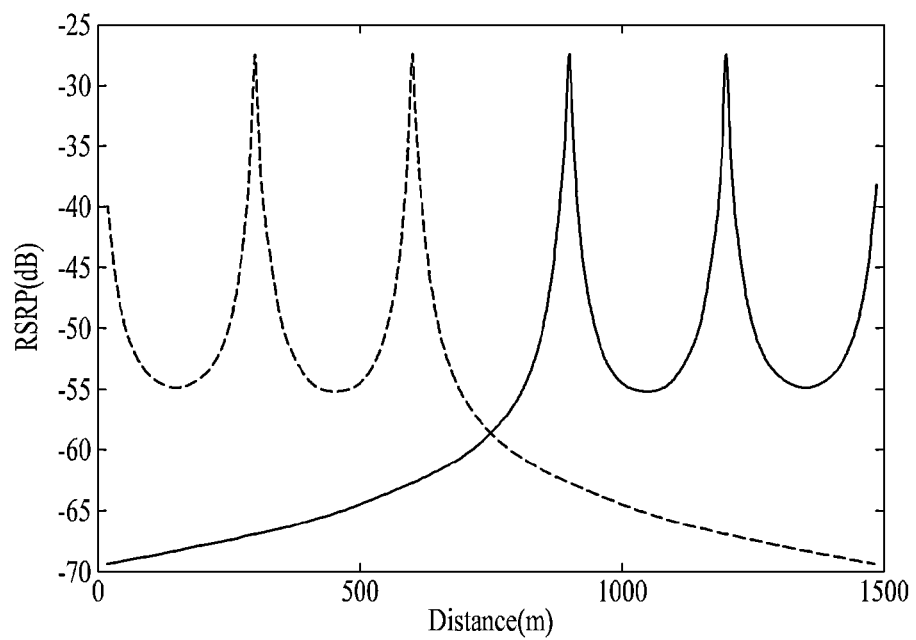

FIG. 11A and FIG. 11B are diagrams for a change of RSRP of a cell according to a movement of a user equipment.

FIG. 11A shows a change of RSRP within one macro cell and FIG. 11B shows a change of RSRP when 19 RRHs exist within one macro cell. As shown in FIG. 11b, it is able to see that an RSRP value (RSRP_cell) of a cell has a form of a big swing around an RRH.

A correlation between RSRP_RRH and RSRP_cell in FIG. 11A and FIG. 11B can be used as a new purpose. If a measured value is big, it may indicate that there is a small number of RRHs belonging to an identical cell around the measured RRH and it also indicates that the measured RRH is located at a cell edge. On the contrary, if a measured value is small, it may indicate that there is a large number of RRHs belonging to an identical cell around the measured RRH and it also indicates that the measured RRH is located at a center of the cell. If a proposed value is greater than a predetermined value, the proposed value can be used as a trigger used for measuring a CRS for a different cell.

Figure 12A:
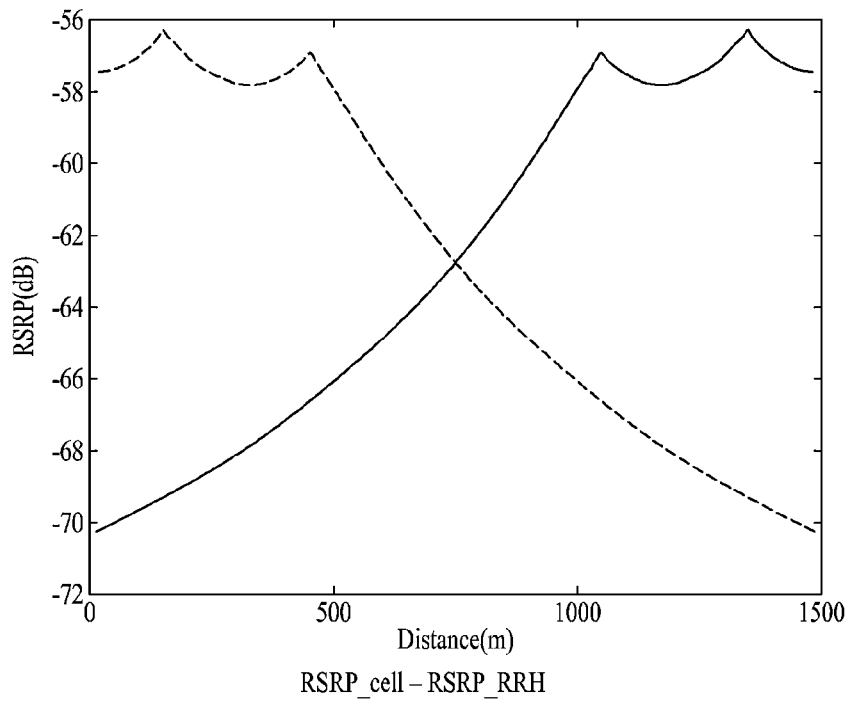
FIG. 12A and FIG. 12B are diagrams for a change of RSRP of a cell according to a movement of a user equipment.
Figure 12B:
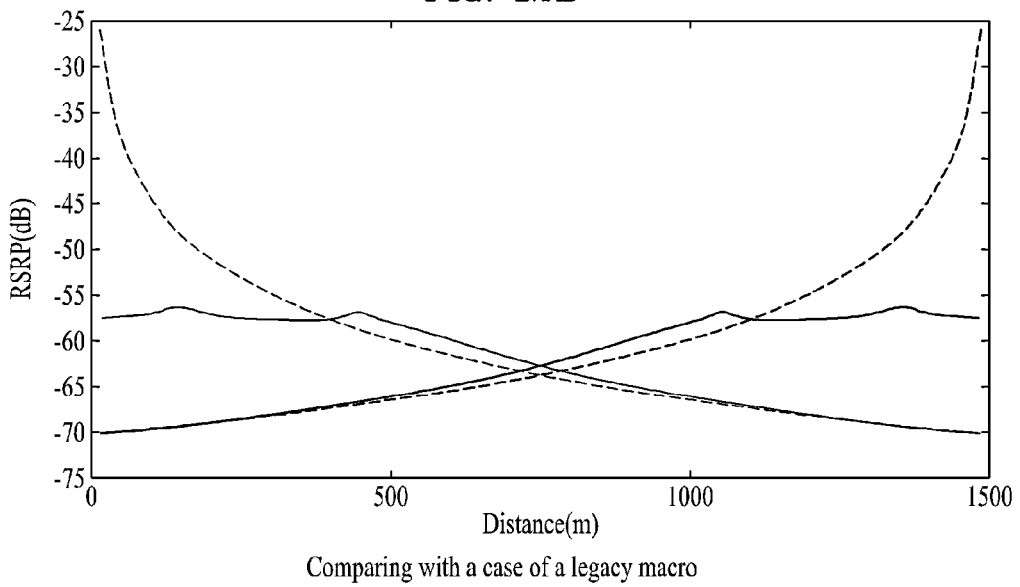

FIG. 12A and FIG. 12B are diagrams for a change of RSRP of a cell according to a movement of a user equipment.

FIG. 12A shows a difference value between RSRP_cell and RSRP_RRH within a macro cell and FIG. 12B shows the difference value between RSRP_cell and RSRP_RRH together with RSRP_cell within a macro cell. The difference value (RSRP_cell−RSRP_RRH) between RSRP_cell and RSRP_RRH can be used as a new purpose. If a measured value (a difference between RSRP_cell and RSRP_RRH) is big, it indicates that there is a small number of RRHs belonging to an identical cell around a measured RRH and it may also indicate that the measured RRH is located at a cell edge. On the contrary, if a measured value (a difference between RSRP_cell and RSRP_RRH) is small, it may indicate that there is a large number of RRHs belonging to an identical cell around the measured RRH and it may also indicate that the measure RRH is located at a center of the cell. If a proposed value (difference between RSRP_cell and RSRP_RRH) is greater than a predetermined value, the proposed value can be used as a trigger used for measuring a CRS for a different cell.

Measurement in C-RAN RRH Switching Situation

Assume that all RRHs within an identical cell transmit an identical CRS and each of the RRHs can be independently measured in a manner that a global CSI-RS port different from each other is allocated to each of the RRHs.

1. Method of Measuring RRH

In order for a user equipment to measure RSRP of an RRH, assume that the user equipment measures global CSI-RS of the RRH. And, the user equipment can perform measurement for associated RRHs. To this end, a measurement configuration should be configured for the associated RRHs. In this case, the present invention proposes to use a new report triggering condition different from a report trigger condition according to measurement of a legacy handover between cells in a manner of defining as follows.

Definition of a New Report Triggering Condition

When RSRP_RRH>T (T is a predefined threshold), in particular, while RSRP of a corresponding RRH is greater than a predetermined value, if 'RSRP_RRH>a×RSRP_RRH_serving (0<a<1)' is satisfied, a report triggering condition can be satisfied. The 'RSRP_RRH>a×RSRP_RRH_serving' means a case that a current serving RRH to RSRP ratio is greater than a predetermined value (if it is converted into dB, RSRP_RRH (dB)>RSRP_RRH_serving (dB)–TH (dB) (TH corresponds to a predefined threshold)).

If a defined report triggering condition is satisfied by one of associated RRHs, the report triggering condition is reported. A base station can change a connected RRH and a primary RRH according to a result of the report.

Method of Changing Connected RRH

Since an associated RRH is mapped to each global CSI-RS port, a user equipment measures a value of the global CSI-RS port and can generate a MAC control element represented by a bitmap of 1 bit for every classified global CSI-RS port. Consequently, the MAC control element can include bitmaps as many as the number of global CSI-RS ports corresponding to the associated RRH. Each of the bitmap can include an RRH activation command (1)/de-activation command (0). In case of activation, the user equipment can perform an additional operation related to the corresponding global CSI-RS port. In case of activation, the user equipment can perform additional measurement such as CQI (channel quality information), PMI (precoding matrix index) and the like and may be able to perform a process configured to participate in transmission and reception process. Meanwhile, a CSI-RS can be separately allocated for the connected RRH.

Figure 13:
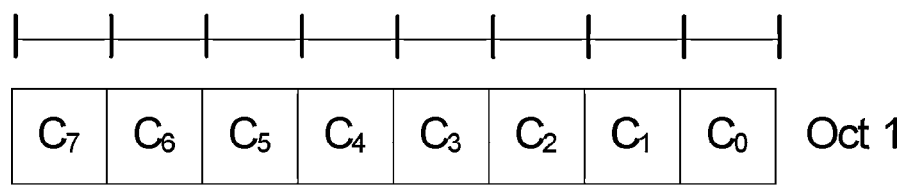
FIG. 13 is a table showing Connected RRH MAC Control Element.

FIG. 13 is a table showing Connected RRH MAC Control Element.

Referring to FIG. 13, a C, field can include an RRH activation (1)/de-activation (0) command in an $i^{th}$ global CSI-RS port with a bitmap. In case of activation, the user equipment can perform an additional operation related to the corresponding global CSI-RS port. In case of activation, the user equipment can perform additional measurement such as CQI, PMI and the like and may be able to perform a process configured to participate in transmission and reception process.

Primary RRH Switching

Figure 14:
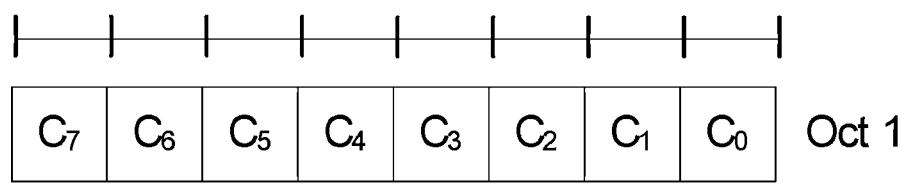
FIG. 14 is a table showing Primary RRH switching MAC Control Element.

In case of a primary RRH switching, a global CSI-RS port number or a bitmap of a primary RRH is transmitted by a MAC control element. FIG. 14 is a table showing Primary RRH switching MAC Control Element.

Referring to FIG. 14, a C, field can include an RRH activation (1)/de-activation (0) command in an $i^{th}$ global CSI-RS port with a bitmap.

It may be necessary to have confirmation according to a change of a primary RRH. This can be implemented by a method of transmitting primary RRH port number received by a user equipment. This process can be performed by a MAC control element.

Updating Associated RRH Set

When a primary RRH is changed, an associated RRH set can be changed as well. There are several kinds of methods used for changing the associated RRH set. If there exists a bitmap for the whole global CSI-RS ports, a global CSI-RS port in which a bit is configured becomes an associated RRH and an additional bitmap for the associated RRH exists, activation/de-activation can be informed based on the additional bitmap for the associated RRH.

All signaling can be performed with an ID of an RRH itself. Or, all signaling can be blindly performed with a global CSI-RS port number.

Table 2 in the following is a table showing a technology of a cell based (S1, X2) handover and a technology of a C-RAN handover.

TABLE 2

|  | Cell based HO | C-RAN HO |
|---|---|---|
| Inter-cell Signaling | S1, X2 based inter-cell IF is necessary performed based on RRC message. Reception confirmation is required. Delay of message transmission/reception may occur. | Controlled within MAC (activation/de-activation, primary node change and the like are signaled) based on MAC control element. Reception confirmation is not mandatory. |
| RACH | Full RACH procedure is required. UL synchronization and dedicated RACH resource are required. | Performed when UL synchronization is required only. Message 3, 4 transmission and reception is not necessary. |
| HO type | Break before make | Make before break |
| Update | Cell radio network temporary identifier (C-RNTI), logical channel ID (LCID), security context, etc. | C-RNTI (if required) |
| Etc | If HO fails, delay is not small. | If HO fails, legacy connection can be maintained. |

Referring to Table 2, in case of a cell based (S1, X2) handover technology, S1, X2 based inter-cell IF is required. Signaling is performed based on an RRC message and reception confirmation for a message transmission is necessary. Delay of message transmission/reception may occur. Full RACH procedure is necessary for a handover (UL synchronization and dedicated RACH resource are required). A C-RNTI, an LCID, a security context and the like are updated. When a handover fails, delay is big.

On the contrary, in case of a C-RAN based handover technology, activation/de-activation, primary RRH change are signaled based on a MAC control element. Reception confirmation for the signaling is not mandatory. A RACH procedure is performed when UL synchronization is necessary only. Message 3, 4 transmission and reception are not necessary for the RACH procedure. A C-RNTI can be updated if necessary. Although a handover fails, a legacy connection can be maintained.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of performing a handover, which is performed by a user equipment in a C-RAN (cloud radio access network), can be industrially applied to various mobile communication systems including 3GPP LTE, LTE-A system, IEEE 802 and the like.

What is claimed is:

1. A method of performing a handover by a user equipment in a cloud radio access network (C-RAN) system, the method comprising:
   receiving, from a serving remote radio head (RRH), information on at least one candidate RRH;
   measuring reception signal strengths of a serving cell of the at least one candidate RRH and the user equipment;
   transmitting feedback information containing the result of the measurements to the serving RRH when a prescribed relationship between a reception signal strength of the serving RRH of the user equipment and a reception signal strength of the serving cell is satisfied as a result of the measurements;
   receiving, from the serving RRH, a message including a command to activate at least one RRH to perform communication together with the serving RRH in response to the feedback information; and
   transmitting data to the at least one activated RRH and the serving RRH simultaneously.

2. The method of claim 1, wherein the prescribed relationship is satisfied when the reception signal strength of the serving RRH is greater than or equal to a predetermined first threshold and a difference between the reception signal strength of the serving cell and the reception signal strength of the serving RRH is less than or equal to a predetermined second threshold.

3. The method of claim 1, wherein the at least one candidate RRH comprises the serving RRH or an RRH communicating with the user equipment.

4. The method of claim 1, further comprising:
   receiving information on a changed serving RRH from the serving RRH.

5. The method of claim 4, wherein the changed serving RRH corresponds to an RRH containing a strongest reception signal strength among the result of the measuring.

6. The method of claim 1, further comprising:
   receiving information on a channel state information-reference signal (CSI-RS) antenna port from the base station, the CSI-RS antenna port is distinguished per RRH.

7. The method of claim 6, wherein the measurement for the at least one candidate RRH is performed in a manner of distinguishing each candidate RRH based on the CSI-RS antenna port.

8. The method of claim 4, wherein the information on the changed serving RRH further comprises information indicating whether to activate or de-activate the at least one candidate RRH.

9. A user equipment performing a handover in a cloud radio access network (C-RAN) system, the user equipment comprising:
   a receiver that receives signals from a remote radio head (RRH);
   a transmitter that transmits signals to the RRH; and
   a processor that:
   controls the receiver to receive, from a serving RRH, information on at least one candidate RRH,
   measures reception signal strengths of a serving cell of the at least one candidate RRH and the user equipment,
   controls the transmitter to transmit feedback information containing the result of the measurements to the serving RRH when a prescribed relationship between a reception signal strength of the serving RRH of the user equipment and a reception signal strength of the serving cell is satisfied as a result of the measurements;
   controls the receiver to receive, from the serving RRH, a message including a command to activate at least one RRH to perform communication together with the serving RRH based on the feedback information, and
   controls the transmitter to transmit data to the at least one activated RRH and the serving RRH simultaneously.

10. The user equipment of claim 9, wherein the prescribed relationship is satisfied when the reception signal strength of the serving RRH is greater than or equal to a predetermined first threshold and a difference between the reception signal strength of the serving cell and the reception signal strength of the serving RRH is less than or equal to a predetermined second threshold.

11. The user equipment of claim 9, wherein the processor further controls the receiver to receive information on a channel state information-reference signal (CSI-RS) antenna port from the base station, and wherein the CSI-RS antenna port is distinguished per RRH.

12. The user equipment of claim 10, wherein the processor further performs the measurement for the at least one candidate RRH in a manner of distinguishing each candidate RRH based on a CSI-RS antenna port.

* * * * *